July 16, 1963 KIYOSHI INOUE 3,098,164

IMPULSE GENERATOR

Filed May 18, 1959 4 Sheets-Sheet 1

INVENTOR.
KIYOSHI INOUE

BY

Reynolds, Beach & Christensen

ATTORNEYS

INVENTOR.
KIYOSHI INOUE
BY
Reynolds, Beach & Christensen
ATTORNEYS

IMPULSE GENERATOR

Filed May 18, 1959 4 Sheets-Sheet 3

INVENTOR.
KIYOSHI INOUE
BY
Reynolds, Beach & Christensen
ATTORNEYS

July 16, 1963 KIYOSHI INOUE 3,098,164

IMPULSE GENERATOR

Filed May 18, 1959 4 Sheets-Sheet 4

INVENTOR.
KIYOSHI INOUE
BY
Reynolds, Beach & Christensen
ATTORNEYS

United States Patent Office 3,098,164

Registered July 16, 1963

3,098,164

IMPULSE GENERATOR

Kiyoshi Inoue, 182 Yoga Tamagawa Setagaya-ku, Tokyo, Japan

Filed May 18, 1959, Ser. No. 813,759
3 Claims. (Cl. 310—111)

This invention relates to improvements in methods and apparatus for machining metal by electric spark discharges produced between the metal surface and the surface of an adjacent electrode under controlled conditions. The invention is herein illustratively described by reference to the presently preferred forms and practices thereof; however, it will be recognized that certain modifications and changes therein with respect to details may be made without departing from the underlying features involved.

An object of this invention is to increase greatly both the efficiency and removal rates attainable with electric spark discharge machining. A further object is to attain a relatively smooth finish at high removal rates.

Still another object of the invention is to develop efficient and practicable electric energy sources for such a process. More specifically, an object is to provide impulse energy sources of the dynamo-electric type for the process and thereby avoid dependence upon electronic circuits as a source of power pulses.

The various features and aspects of the invention will become evident as the description proceeds with reference to the accompanying drawings.

Figure 7A:
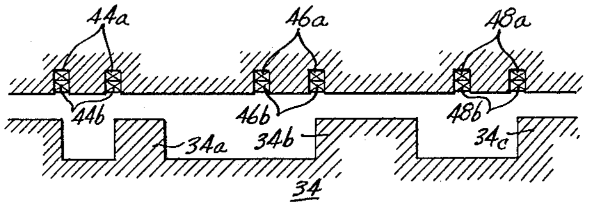

FIGURE 7*a* is a development view of a modification.

Figure 3:
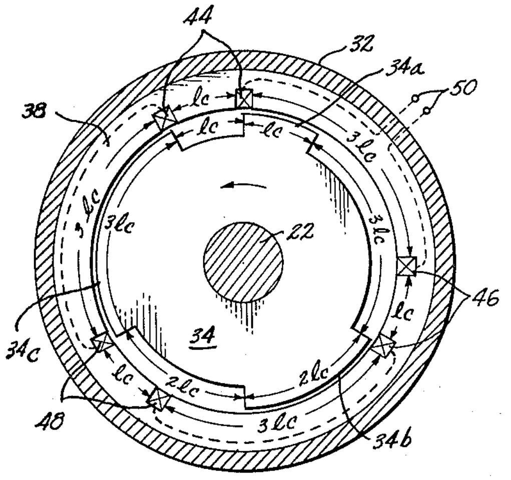
FIGURE 3 is a simplified transverse sectional view, taken on line 3—3 in FIGURE 4, of motor-driven brushless rotary impulse generating apparatus by which the desired discharge machining wave forms may be produced.
Figure 4:
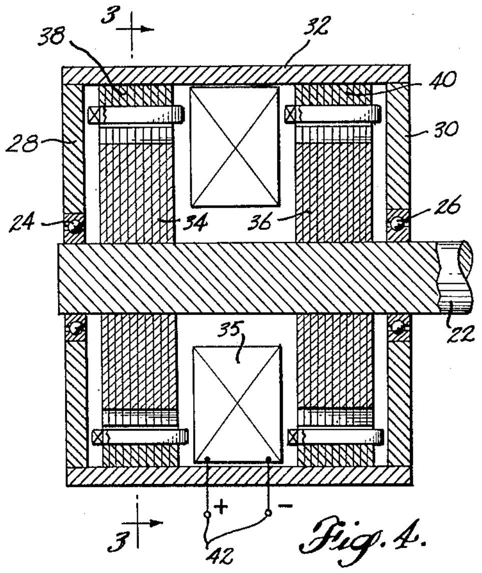
FIGURE 4 is a simplified longitudinal sectional view of such rotary impulse generating apparatus.
Figure 7B:
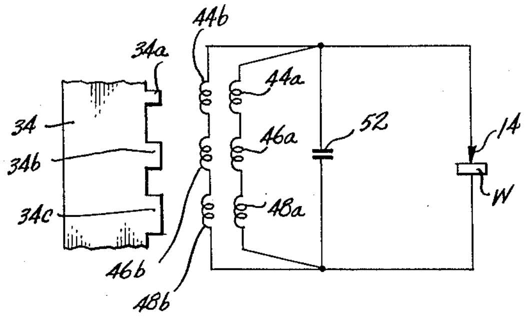

FIGURE 7*b* is a schematic diagram of a modified brushless impulse generating apparatus basically of the type shown in FIGURES 3 and 4, but incorporating two stator coils for each of the coils in the basic form.

Figure 8:
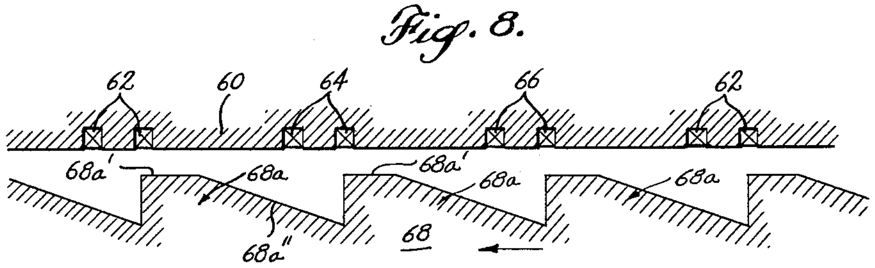

FIGURE 8 is a development view of a first modified brushless rotary impulse generating apparatus by which the desired spark discharge machining wave forms may be generated.

Figure 5:
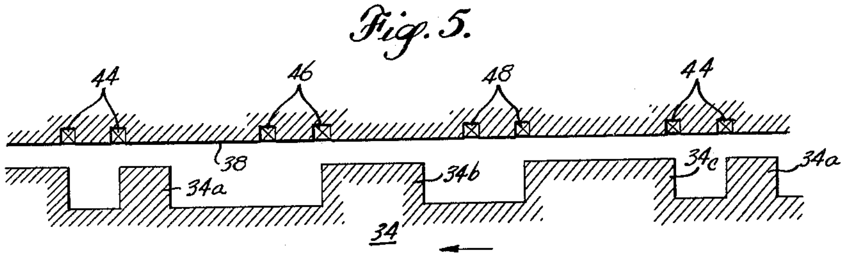
FIGURE 5 is a development view of the rotary salient pole structure and associated stator of the apparatus shown in FIGURES 3 and 4, the development being based on a section taken transverse to the axis of rotation.
Figure 9:
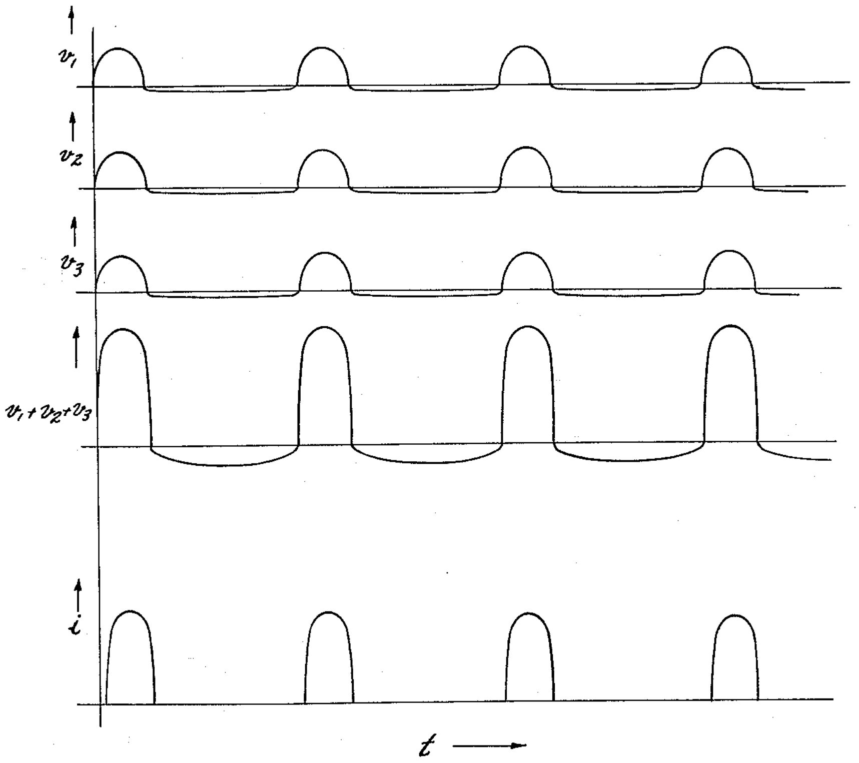

FIGURE 9 is a wave diagram illustrating the principle of operation of such modification, the view being based on a transverse section as in FIGURE 5.

Figure 10:
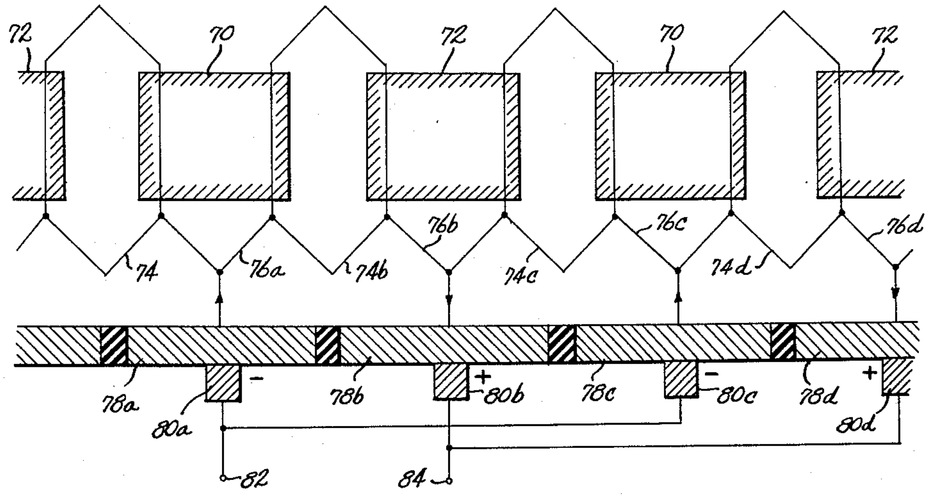

FIGURE 10 is a development view of a commutator or direct-current rotary impulse generator for the same purpose, the development view in this case showing the coils and pole faces in full, and their relationship to the commutator segments.

Figure 1:
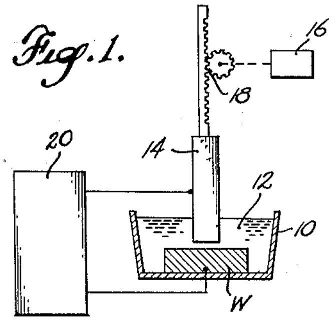
FIGURE 1 is a simplified drawing of spark discharge machining apparatus of a type to which the invention applies.

Referring to the drawings, FIGURE 1 illustrates in simplified form spark discharge machining apparatus comprising a metal work piece W supported on or fixed to the bottom of a tank 10 containing a dielectric fluid 12. An electrode 14 having a working face is positioned continuously adjacent to the machining surface of the work piece W by a servomechanism 16 acting through a suitable transmission means 18 such as the illustrated rack and pinion. A source of unidirectional electrical impulses 20 having output terminals connected respectively to the electrode 14 and work piece W provides the spark discharge machining energy. The servomotor 16, controlled by suitable gap-sensing means (not shown), continuously maintains the desired small discharge gap between the electrode and the work piece W. This discharge gap should be maintained sufficiently short to prevent arcing, yet sufficiently great to avoid continuous direct electrical contact between the two metal surfaces. The fluid should be circulated.

Figure 2:
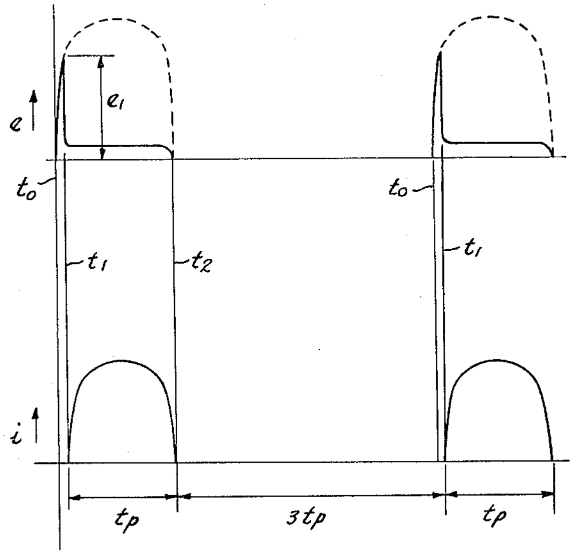
FIGURE 2 is a diagram showing the voltage and current wave forms applied in spark discharge machining apparatus in accordance with this invention.

Referring to FIGURE 2, the dotted-line wave form depicted in graph *e* typifies the no-load voltage wave generated by a suitable source 20. During each impulse, voltage rises from zero value commencing at time $t_0$, until it reaches a value $e_1$ which represents the spark discharge point. At this instant spark discharge current $i$ (lower figure) commences to flow between the electrode and work piece, increasing from zero value and thereafter following approximately the load voltage wave form to its termination at time $t_2$. At time $t_1$ the output voltage from source 20 drops abruptly to a low value by reason of the heavy loading of the source caused by the low impedance developed across the spark gap during the discharge. The current impulses $i$ have a duration $t_p$ measured from time $t_1$ to time $t_2$ during which time the metal removal action occurs.

One of the important and essential characteristics of the spark discharge machining process is that the amount of metal removed for a given amount of electrical energy consumed be as high as possible. Energy $w$ (approximately equivalent to the amount of energy consumed in machining) consumed by the discharge is formulated as follows:

$$w = \int_{t_0}^{t_2} e \cdot i \cdot dt$$

where $e$ is the instantaneous value of applied voltage as a function of time and $i$ is the instantaneous value of discharge current as a function of time. The surface area of the electrode and work piece subjected to spark discharge current flow is limited so that the spots of concentrated discharge within that area will be heated rapidly to the point of partial evaporation and melting of the metal. Metal molecules removed by evaporation are cooled by the dielectric fluid 12 and metal molecules freed by melting are dispersed by the mechanical pressures resulting from the violent evaporation of dielectric fluid due to the intense localized discharge heat. These are also cooled by the fluid. Thus, the machining process is due to both evaporation and melting and also to mechanical forces resulting from fluid evaporation at the points of discharge. The conditions or factors which affect the efficiency of machining and also the rate of metal removal are found to vary widely depending upon the manner in which the electrical energy is applied.

Heretofore the operation of spark discharge machining apparatus has been under conditions which are now found to be wholly outside the range of satisfactorily efficient and rapid operation. It has now been found that if the pulse length is too short the process of discharge machining will be highly inefficient. This is due to the fact that the discharge energy which produces heat will be sufficient only to evaporate a small amount of metal at the localized point of discharge. Inappreciable melting of metal will take place under these conditions since the heating action is not spread out far enough to surrounding areas to melt those areas. Since for a given amount of energy consumed a far greater amount of metal may be converted from a solid state by melting them by evaporation, the energy which is dissipated in metal removal under the described conditions is necessarily used inefficiently to convert the metal from its solid state for removal.

On the other hand, if the pulse length is too long the process is also inefficient. During an excessively long discharge the heating area spreads out beyond the region where temperatures can be maintained at a sufficiently high value, at the rate of energy dissipation available from the impulse generating apparatus, to melt all or most of the metal which is being heated. Much of the metal, therefore, in the outlying areas is merely heated but is not melted and this heat is lost by conduction, radiation and convection. Furthermore, this useless heat not only reduces the efficiency of the apparatus in terms of the amount of metal removed for the amount of electrical energy expended, but also creates a cooling problem which reduces the removal rates attainable by the apparatus. This it does by unduly prolonging the necessary inter-pulse cooling interval and thereby affecting removal rates, in accordance with the principles described later herein.

On the basis of such analysis and exhaustive experimentation it has now been discovered that there is a certain range of pulse lengths which must be observed or maintained if reasonably high efficiency is to be attained by the process. It has also been observed that those operating in this field heretofore have not recognized this range and it may be shown that the range is critically important. In general, if the pulse length is within the range between 200 and 800 microseconds, the efficiency of operation will be high regardless of electrode area, work materials used or other conditions of the process, whereas if it is outside this range the efficiency drops rather steeply to values too low to be commercially satisfactory. It should be recognized, however, that the upper and lower limits indicated are approximate values indicating orders of magnitude in the sense that the efficiency characteristic does not break so abruptly that there is a great difference between efficiency at a pulse length of 199 microseconds, for example, and one of 201 microseconds. Nevertheless, the range is quite critical in that deviations beyond either limit by more than a few percent produce much more than a proportionate decrease of efficiency.

The companion condition of pulse interval is also critically important to the commercial success of the apparatus since it directly determines the removal rates attainable as well as the removal efficiency. If the interval between pulses is too short, for example, the work surface remains heated and causes continuing evaporation of dielectric fluid, hence ionization of such fluid, which carries over or continues to the time of the commencement of the succeeding discharge impulse. Thus, when the succeeding impulse is applied, it is likely that an arc discharge, as distinguished from a spark discharge, will develop in the previously eroded area again, due to the low electrical resistance which remains in the ionized area. In fact, however, it is desired that the succeeding spark discharge should develop in a less eroded area so as to produce gradual and progressive leveling of the surface over the entire area and thus achieve the desired machining action. The reason an arc discharge may occur in the first-mentioned previous discharge area if the work does not cool off sufficiently that ionization ceases in the interval between pulses is that the actual gap distance now existing between the electrode surface and the work surface in that specific area is too great to permit the discharge to remain a mere spark discharge. Instead, it breaks into an arc, which is found to be virtually ineffective to remove metal since it lacks the thermal-electric and mechanically explosive or displacing effect of a spark discharge. As an end result, therefore, the removal rate is reduced and the efficiency of the process is also reduced greatly by maintaining an interval between pulses which is too short to permit adequate cooling between pulses.

On the other hand, a pulse interval which is too long obviously reduces the metal removal rate obtained inasmuch as the apparatus is not working at its full capacity under these conditions.

It has, therefore, been found necessary to determine an optimum pulse interval. It is found by analysis and verifying experimentation that the interval must be measured in terms of pulse length; moreover, that a constant ratio of a certain value is necessary and is the same in all cases, regardless of pulse length variations, materials used, etc. Specifically, it is found that a duty cycle of one-fourth, namely, an idle time equal to three times the length of the individual pulses, is substantially optimum and that if the pulse interval is increased or decreased (such as by more than a few percent) materially from that ratio, the removal rate decreases materially. If the pulse interval is reduced materially below that of the ratio, the efficiency suffers more than proportionately as does the removal rate.

Consequently, it has been discovered that regardless of pulse length and other variables, pulse interval (time lapse between the end of one pulse and initiation of the succeeding pulse) should be three times the duration of the individual pulses. The fact that this relationship is permitted to be a fixed one is believed to be attributable to the relatively great volume of cooling fluid in the container 10 relative to the volume which actually occupies the space between the electrode and work piece. Thus, even when the supply energy varies greatly, the cooling effect does not vary appreciably. Thus, pulses varying in length between 200 and 800 microseconds and spaced apart by three times the pulse duration produce unexpectedly high-efficiency machining and high metal removal rates as well. Under these conditions it is also found, for some reason, that the machined surface of the metal is less pitted and more highly finished than when the former techniques were employed, using greater amounts of power to produce the same removal rates as a basis of comparison.

There remains to be provided practicable and efficient apparatus capable of delivering unidirectional power pulses in accordance with the foregoing teachings and preferably involving means not subject to the limitations and disadvantages of electronic type impulse generators. FIGURES 3, 4 and 5 illustrate a preferred form of rotary dynamo-electric unidirectional impulse generator capable of performing this function. This device comprises a ferromagnetic shaft 22 rotatively supported in bearings 24 and 26 mounted centrally within the non-magnetic end plates 28 and 30, respectively. These end plates are interconnected by a cylindrical ferromagnetic shell 32 forming part of the field structure of the stator. An annular exciter coil 35 is mounted within the housing or shell 32 at a location generally intermediate the end plates 28 and 30. Mounted on the shaft 22 between the coil 35 and the end plate 28 is a first ferromagnetic rotor structure 34. A similar rotor structure 36 is mounted on the shaft between the end plate 30 and the coil 35. The stator core is formed in two parts, one the laminated annular ferromagnetic structure 38 which surrounds the rotor structure 34, and the other the similar ring structure 40 which surrounds the rotor structure 36, the two ferromagnetic stator core assemblies 38 and 40 being mounted directly in contact with and within the ferromagnetic shell 32. Thus, a magnetic flux path is formed which includes the shaft 22, arranged serially with the rotor structure 34, the ring structure 38, the cover 32, the ring structure 40, the rotor structure 36. The coil 35 is energized by direct current applied through terminals 42, and the shaft 22 is rotated by a suitable motor (not shown) operated at a constant speed which produces the desired pulse length and spacing as explained below.

In FIGURE 3 the stator core 38 has three sets of slots arranged at equal intervals around its periphery. These slots contain the stator coils 44, 46 and 48, respectively. Each coil occupies a given portion of the periphery, designated $l_c$, whereas the spacing between adjacent coils is equal to three times $l_c$. The cooperating rotor core structure 34 has salient portions 34*a*, 34*b* and 34*c*. The portion 34*a* has a peripheral length equal to that of the coils, namely $l_c$. The portion 34*b* has twice the peripheral length of the portion 34*a*, whereas the portion 34*c* has a peripheral length equal to three times that of the portion 34*a*. The peripheral spacing between adjacent edges of the portions 34*a* and 34*b* is equal to three times the peripheral length of the salient portion 34*a*, whereas the peripheral spacing between the portions 34*b* and 34*c* is equal to twice that amount; likewise the peripheral spacing between the portions 34*c* and 34*a* is equal to $l_c$. The coils 44, 46 and 48 are connected in series as indicated by the dotted lines in FIGURE 3, and lead to output terminals 50 which are to be connected to the work piece and electrode, respectively, in the electric discharge machining apparatus (FIGURE 1). These relationships are demonstrated in the development view of FIGURE 5 and their effect is illustrated in the wave diagrams of FIGURE 6.

Figure 6:
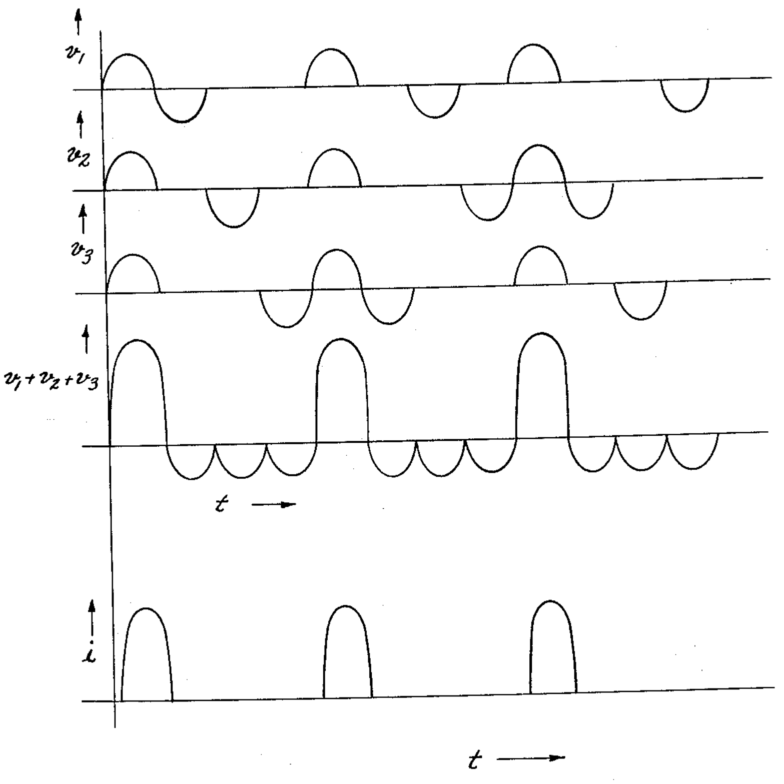
FIGURE 6 is a wave diagram illustrating the principle of operation of such rotary impulse generating apparatus.

In FIGURE 6 the successive wave forms $v_1$, $v_2$ and $v_3$ represent the induced voltages in the respective coils 44, 46 and 48, whereas the combined wave forms $v_1$ plus $v_2$ plus $v_3$ represents the summation of these individual wave forms, and therefore the output voltage as it appears at the terminals 50. As the salient pole 34*a* commences to enter the induction field region of the coil 44 (i.e., pass under the coil as shown in FIGURE 5), with the rotor structure 34 moving in the direction of the arrow, there will thereafter be a progressive increase in the magnetic flux linking the coil 44, giving rise to the positive portion of the first wave in the graph $v_1$ in FIGURE 6. As the salient pole 34*a* commences to leave the field region of coil 44, there will be a corresponding decrease of flux linking the coil and a resulting negative voltage impulse induced in the coil, thereby completing a full cycle of a wave of substantially sinusoidal form. Subsequently, as the salient pole 34*b* enters the field of coil 44 there will be a similar positive impulse but, because the salient pole 34*b* is twice the length of the pole 34*a*, there will be an interval between the termination of the positive impulse and the commencement of the ensuing negative impulse. Due to the geometry of the structures as illustrated, this interval will be as wide as the individual impulse. Thereafter, the approach of the salient pole 34*c* to the coil 44 produces a succeeding positive impulse and an ensuing negative impulse separated from the positive impulse by three times the length of the impulses themselves, since the salient pole 34*c* is equal to three times the length of the salient pole 34*a*. In like manner the wave forms $v_2$ and $v_3$ induced in the other coils 46 and 48 may be analyzed and depicted as in FIGURE 6. When these impulses are all added together by reason of the series interconnection of the coils, a resulting wave form is produced consisting of positive-going impulses which are three times the amplitude of the individual impulses and which are separated by intervals three times the length of such positive impulses. Low-amplitude negative impulses occur during these intervals but are only one-third the amplitude of the positive impulses. By coil and field structure design these negative impulses are made less than the value of voltage $e_1$ required for spark discharge in the gap.

When the output terminals 50 of such a device are connected to the electrode and work piece of the discharge apparatus as in FIGURE 1, discharge current flows as indicated by the graph $i$ in FIGURE 6. This discharge current is unidirectional due to the fact that the negative impulses are of insufficient amplitude to produce current flow in the medium whereas the positive impulses are sufficient to produce the desired spark discharge current.

The effect is as if the negative impulses of voltage produced by the apparatus are nonexistent.

In the modification shown schematically in FIGURE 7 the same essential physical arrangement is employed (FIGURE 7*a*) as in the form shown in FIGURE 5, but in this case the stator slots contain two sets of coils. The first set comprises coils 44*a*, 46*a* and 48*a* which are serially connected with each other and which have a high inductance, although may have a relatively high internal resistance, hence may comprise relatively fine wire. The second set of coils 44*b*, 46*b* and 48*b* may comprise a fewer number of turns of relatively heavy gauge wire capable of delivering relatively high current flow at relatively low voltage. The coils of the second set are also serially connected and the two sets of coils are connected in parallel and are shunted by a condenser 52 as shown in FIGURE 7*b*. The coils 44*a*, 46*a* and 48*a* provide the necessary high voltage to produce initial ionization of the spark gap between the electrode and work piece, whereas the coils 44*b* ,46*b* and 48*b* provide the necessary high-current flow at low voltage once the gap has been broken down and discharge initiated. The condenser 52 is chosen to resonate with the combined inductance of the coils at the fundamental recurrence rate of the impulses. As a result, the apparatus efficiently provides the desired igniting voltage and high amperage current flow necessary for machining a work piece of considerable size by a dynamo-electric impulse generator of relatively small size.

Still another and further modified brushless induction type dynamo-electric impulse generator appears in FIGURE 8 constituting a development view similar to the view in FIGURE 7 of the first described form. In the modification of FIGURE 8, the stator structure 60 has slots in which coils 62, 64 and 66 are embedded and which cooperate with a rotary core structure 68 having saw-tooth-like salient poles 68*a* of similar form and spacing arranged about its periphery. The leading edge of each such salient pole is disposed in a substantially radial plane and is adjoined by a circumferential surface 68*a'* connected to the leading edge of the succeeding tooth by a long sloping face 68*a''*. The salient pole interval is equal to the coil interval. As the rotor structure 68 rotates in the direction of the arrow, the magnetic flux linked with each coil varies most rapidly when the vertical or radially disposed faces of the salient poles commence passing beneath the coils. Thereafter, as the sloping surfaces 68*a''* pass beneath the poles, there is a gradual decrease of flux linkage. The resultant wave forms $v_1$, and $v_2$ and $v_3$ of voltage generated in the coils 62, 64 and 66 are shown in FIGURE 9 and are seen to comprise spaced positive impulses with intervening low-amplitude negative impulses. The summation of these impulses, obtained by connecting the coils in series, appears in the wave form designated "$v_1$ plus $v_2$ plus $v_3$." As in the previous instances, the value of the negative voltage portion of the resultant wave is insufficient to produce spark discharge between the electrode and work surface whereas the positive impulses are sufficient to produce the desired action. The current impulses shown in the last graph in FIGURE 9 illustrate the flow of current in the working circuit of the apparatus under these conditions.

In FIGURE 10 there is illustrated an impulse generator of the commutator type. This machine comprises alternating north and south poles 70 and 72 of which there may be any desired number spaced uniformly about the periphery of the machine. In this illustration, the magnetic poles comprise part of the stator structure. The rotor structure comprises the coil system and the commutator assembly connected thereto. The individual coils 74*a*, 74*b*, 74*c*, 74*d*, etc. have a circumferential width narrower than the width circumferentially of the magnetic poles. The coils are serially connected by bridging conductors 76*a*, 76*b*, 76*c*, 76*d*, etc. which, in turn, are individually connected to the commutator segments 78*a*, 78*b*, 78*c*, 78*d*, etc. The commutator segments are wider in circumference (measured in degrees) than the angular or circumferential width of the magnetic poles. The individual commutator segments are insulated from each other and are arranged to be engaged by commutator brushes 80*a*, 80*b*, 80*c*, 80*d*, etc. arranged at the same spacing as the spacing of the segments themselves. Alternate brushes are interconnected and lead to the pair of output terminals 82 and 84.

In operation the commutator brushes are just being contacted by the commutator segments as the coils begin to advance into flux linkage with the magnetic poles. Moreover, the spacing and relative positioning of the components is such that as the coils come into full alignment with the individual poles, the brushes are then in positions of transition between successively adjacent commutator segments. Consequently, the induced voltage in each coil is the highest when the coils are in their illustrated positions shown in FIGURE 10, at which time the insulating separators between the commutator segments are furthest removed from the brushes. By the same token, the induced voltage in the coils is at its minimum or zero at the time of the transition, namely, when the brushes pass over the insulation material. Consequently, arcing and sparking at the commutator is completely avoided by this arrangement. The desired ratio of pulse length to pulse interval may be readily established simply by changing the ratio of circumferential coil width to circumferential magnetic pole width, whereby the desired pulse length and pulse interval described may be readily achieved by simple and well known design considerations requiring no elaboration herein.

Accordingly, the invention will be seen to comprise a unique and improved technique pertaining to spark discharge machining and to desirable apparatus implementing the same so as to render the spark discharge machining process commercially feasible and economical. The various modifications and variations of the invention which are possible within the scope of the disclosed illustrations thereof will be recognized by those skilled in the art.

I claim as my invention:

1. Impulse generator means comprising cooperable rotor and stator members, said rotor member comprising a succession of circumferentially spaced coils connected in a closed series, said stator means comprising circumferentially spaced magnetic poles of alternately opposite polarity, the circumferential pole width materially exceeding the circumferential pole spacing, and the circumferential coil width materially exceeding said pole spacing and being materially less than said pole width, commutator means comprising a succession of separately insulated segments mounted on said rotor of a circumferential width materially exceeding said pole width and individually connected electrically to the intercoil connections, respectively, and a series of brushes engaging said commutator means, with alternate brushes connected electrically to respectively opposite sides of said output, the circumferential brush spacing from center to center being substantially equal to the similar coil spacing and with the segments being circumferentially positioned intermediate the coils.

2. Impulse generator means comprising cooperable rotor and stator members, one of said members having three circumferentially equi-spaced induction coils thereon electrically connected in series between the generator output, the circumferential spacing between coils being substantially three times the circumferential width of the individual coils, the other of said members having three circumferentially spaced salient magnetic poles of like magnetic polarity, one such pole being circumferentially substantially as wide as one such coil, and the other such poles being circumferentially substantially two and three times as wide, respectively, the circumferential spacing between the first-mentioned such pole and that two times the circumferential width thereof being substantially three times the circumferential width of a coil, the circumferential spacing between the latter pole and the widest pole being substantially twice the circumferential width of a coil, and the circumferential spacing between the narrowest and widest poles being substantially the circumferential width of a coil, and means operable to rotate said rotor member relative to said stator member.

3. Impulse generator means comprising cooperable rotor and stator members, one of said members having "$n$" circumferentially equi-spaced induction coils thereon electrically connected in series between the generator output, the circumferential spacing between coils being substantially "$n$" times the circumferential width of the individual coils, the other of said members having "$n$" circumferentially spaced salient magnetic poles of like magnetic polarity, one such pole being circumferentially substantially as wide as one such coil, and the other such poles being circumferentially substantially integral multiples from two to "$n$" times as wide, respectively, the circumferential spacing between the first-mentioned such pole and that two times the circumferential width thereof being substantially "$n$" times the circumferential width of a coil, the circumferential spacing between the latter pole and the next widest pole being substantially "$n-1$" times the circumferential width of a coil, and the circumferential spacing between succeeding poles and those in turn succeeding them being substantially "$n-2$", "$n-3$", etc., times the coil width, respectively, and means operable to rotate said rotor member relative to said stator member.

References Cited in the file of this patent

UNITED STATES PATENTS

| | | |
|---|---|---|
| 1,250,752 | Alexanderson | Dec. 18, 1917 |
| 1,597,453 | Merrill | Aug. 24, 1926 |
| 2,120,109 | Merrill | June 7, 1938 |
| 2,453,019 | King | Nov. 2, 1948 |
| 2,465,297 | Thompson | May 22, 1949 |
| 2,872,602 | Herr | Feb. 3, 1959 |
| 2,872,603 | Herr | Feb. 3, 1959 |

FOREIGN PATENTS

| | | |
|---|---|---|
| 622,090 | Great Britain | Apr. 26, 1949 |
| 1,151,570 | France | Jan. 31, 1958 |